2,973,302
PURIFICATION OF COLLAGEN

Alfred Bloch, Highland Park, and Irving B. Oneson, Somerville, N.J., assignors to Ethicon, Inc., a corporation of New Jersey No Drawing. Filed Feb. 5, 1958, Ser. No. 713,313

10 Claims. (Cl. 195—6)

This invention relates to the purification of collagenous material and more particularly relates to the removal of noncollagenous substances from connective tissues by enzymatic means, whereby purified collagenous material is produced which may be rapidly and substantially completely dispersed in a solvent solution with a low degree of degradation of the collagen. The present application is a continuation-in-part of our co-pending application Serial No. 509,426, filed May 18, 1955, and now abandoned.

Numerous attempts over many years have been made to utilize mammalian connective tissue such as tendons and bladders, as well as fish bladders, as a source of collagen for the preparation of collagen articles in the form of films, tubes, casings, sponges, and the like, and particularly for the preparation of collagen strands for use in suturing and ligating. Heretofore, crude collagenous materials were treated by physical means to remove extraneous matter including fat and muscle tissue and an aqueous dispersion of the collagen was then prepared. In preparation of the dispersion, the collagen was swollen in water, dilute acid or alkali, macerated by physical means and then dispersed in a dilute aqueous acid solution. Non-dispersible matter was removed from the dispersion of collagen and the purified dispersion was treated in a variety of ways to produce the desired shaped collagen article. Collagen strands have been produced by extruding the dispersion in a continuous manner into a liquid such as acetone which is capable of precipitating the collagen in the dispersion. Shaped collagen articles prepared by methods heretofore used have been characterized by marked degradation of the collagen molecules and a subsequent decrease in tensile strength. The decrease in tensile strength of strands of collagen prepared according to methods heretofore used has been of such an order that they were not acceptable to the surgical profession for use in suturing and ligating. The reason for the loss of tensile strength is considered to be that the collagen molecules or aggregates of collagen molecules present in the connective tissue have been degraded during the preparation of the dispersion. Attempts have been made to minimize degradation of native collagen during the preparation of collagen dispersions by using only small amounts of acid or alkali in preparing the collagen dispersion and also by preparing the dispersions at a low temperature; however, such expedients have not resulted in the production of shaped collagen articles such as strands of collagen having substantially improved tensile strength because the use of weaker acids or a lower concentration of acid and the preparation of the dispersion at a low temperature have increased the time required to form the dispersions. An increase in the time during which the collagen is dispersed in a suitable solvent also results in degradation of the native collagen.

It is an object of the present invention to prepare dispersions of purified undegraded collagen from connective tissues.

It has now been discovered that thin slices of collagenous may be purified by an enzymatic digestion and that the purified collagen after removal or destruction of the enzyme may be readily dispersed in a suitable solvent with minimum degradation. The great ability of collagen to swell and disperse in acids is well recognized, once the collagen is isolated from its original environment. It is the method of isolating collagen from its original environment in an economical manner, both with respect to yield and preservation of the high molecular structure, that is the subject matter of the present invention.

Connective tissue is composed of four groups of components: Fibrous proteins, polysaccharides or mucopolysaccharides, also called ground substance or cement substance, various cellular structures and the humorous portion which, in the case of tendons, resembles blood plasma. The character of each connective tissue is determined by the quality of these components and their quantitative relationship with one another.

It is the first two groups, namely the fibrous proteins and the polysaccharides, which determine the physical-chemical behavior of connective tissues and especially the mode of their dispersibility. Three types of fibrous proteins are present in connective tissues: collagen, reticulin and elastin.

These three fibrous proteins are fairly well defined chemically, that is in respect to their amino acid composition and in their physical and chemical reactivity. It must be pointed out here that physiologically speaking the protein moiety of these fibers cannot be separated from the carbohydrate moiety. From the chemical and technological point of view, these fibrous proteins are considered per se, although no preparation has been reported in the literature which was entirely freed from all carbohydrate components.

Collagen is defined by its constancy of the amino acids proline, hydroxyproline and hydroxylysine; by the absence of tryptophane and its low tyrosine and sulfur content; but particularly by its high content of polar groups originating from the difunctional amino acids. It is due to this high content of polar groups that collagen has its great swelling properties leading eventually to dispersion in the swelling medium.

Elastin, which is by far less well investigated than collagen, is defined by its very low content of polar groups, hence, its low reactivity and particularly its inability to swell. In many physical respects it resembles rubber, especially in its elasticity, wherefor it is also called elastic tissue. Elastin, in contrast to collagen, has never been dispersed in swelling media.

Reticulin is the least well elucidated protein of the connective tissue fibrous proteins. Its amino acid composition has been reported to resemble closely that of collagen; the carbohydrates associated with it are of a far higher amount, and in addition it seems to contain a considerable amount of myristic acid. It does not swell like collagen. Whereas certain structures, such as the base membrane of the kidney, are substantially composed of reticulin, connective tissues such as tendon or skin contain only very small amounts of it. This minor component, however, due to its non-swelling character, is very annoying in the technology of producing collagen dispersions and has to be removed.

A significant difference between collagen and elastin is their different response when exposed to certain proteolytic enzymes. Enzymes which hydrolyze undenatured collagen are called collagenases. At the present, only one such collagenase derived from the micro-organism clostridium histolyticum has been thoroughly investigated. This enzyme will not hydrolyze elastin.

Other proteolytic enzymes, as for instance, trypsin, do not hydrolyze undenatured collagen. However, if collagen is altered, as for instance by denaturation with urea, or by comminution to fine particle size, it can be hydrolyzed by such enzymes as trypsin. Standard hide powder, well known to leather chemists, is digested by most proteolytic enzymes. Acid swollen collagen is also rendered relatively digestible by many different animal and plant enzymes. This is a very important factor in our invention. For when collagen is dispersed in an acid medium, its particle size is reduced and it becomes subject to hydrolysis or degradation by enzymes which will not hydrolyze collagen in its original state as present in intact connective tissue, i.e., in hide or tendon.

Enzymes which hydrolyze elastin are called elastases. Elastases can be derived from certain micro-organisms (*B. subtilis*) from pancreas, and also from certain plants (the fig plant). Whether these elastases hydrolyze only and exclusively the protein moiety of elastin; or whether they also attack the carbohydrate moiety associated with the elastin; or whether the latter is possibly a prerequisite for the former, is not established.

Proteolytic enzymes are known to be not as substrate-specific as some other types of enzymes are. We have also found that pancreatic elastase, microbial elastase or elastases derived from certain plants will also hydrolyze collagen when the pH conditions are changed. We are, however, not certain at this time if this non-specificity is actually due to the pH change only or to the coexistence in the enzyme preparations of different enzymes acting on the different substrates at varied pH conditions.

As demonstrated in the examples, we let the elastases act upon the connective tissues under pH conditions under which the elastase activity only becomes manifest, whereas the collagen is not hydrolyzed. We have found, however, that elastases or other associated proteolytic enzymes are adsorbed onto the collagen fibers and are tenaciously kept there. Therefore, when the collagen, substantially free from elastin, is placed in an acid medium for swelling and dispersion, the proteolytic enzymes still present and potentially active, will then gradually degrade the swollen collagen to such a degree that it is no longer useful for the technology for which it is intended. For this reason, the enzymes must be removed by very thorough washings, or as is possible with the described plant enzymes, they must be inactivated after the elastin is hydrolyzed. Without this removal or inactivation of proteolytic enzymes, the process fails and a degraded collagen results.

It is readily apparent from microscopic examination of connective tissue why the enzymatic hydrolysis and removal respectively of the elastin fibers has such a profound effect on the subsequent swelling and dispersibility of the collagen. The elastin fibers are intimately associated and intertwined with the collagen fibers, holding the latter together in bundles. When exposed to acid, the elastin does not swell or loosen at all, thus suppressing and inhibiting the swelling and dispersion of the collagen fibers enclosed in elastin fibers. With the removal of the elastin, the collagen fibers are no longer tied up in bundles. The whole collagen structure loosens up and the influence of the acid becomes more efficient under milder acid conditions and in a shorter time.

In the process of the present invention, connective tissue from which fat, muscle or other components has been removed is sliced to a thickness of about 10 to 30 mils, or reduced to particles of similar size by any appropriate mechanical means and then treated with an elastase solution which is inert to collagen but capable of acting on and dissolving non-collagenous components such as elastin. Enzymes derived from malt diastase U.S.P. IX and enzymes from micro-organisms, particularly of the *B. subtilis* group, have been found capable of removing non-collagenous components from native collagen without having any degrading effect on the collagen itself. Ficin and pinguinain are other elastases effective for our purposes.

Finely divided connective tissue substantially free from fat and muscle tissue, is treated with a solution of the enzyme at a temperature within the range of from about 5° C. to about 40° C. for a time sufficient to substantially remove elastin. The concentration of the enzyme solution may be varied depending upon the particular enzyme used. Ficin, for example, gives good results at concentrations of about 0.01% to 0.1%. At a temperature below about 5° C. the reaction is extremely slow and at a temperature above about 45° C. the collagen is adversely affected. The usual time required for the treatment is about ten hours and is related to the particular elastase used and the temperature of the treating solution, the time of the treatment being shorter at higher temperatures. When the time of treatment is shorter than about ten hours at a temperature low in the above range, the non-collagenous components are incompletely removed. The pH of the treating solution is adjusted to a point substantially within the range of from about pH 5 to about pH 9, depending upon the enzyme used. Elastase action outside the range from about pH 5 to about pH 9.5 is negligible. At a pH close to the isoelectric point, swelling and degradation of collagen is at a minimum.

After treatment with an enzyme solution, the finely divided collagen is thoroughly washed or treated with hydrogen peroxide to destroy the residual enzyme and is then dispersed in a suitable solvent and preferably an aqueous solvent. The time required for the formation of the collagen dispersion is markedly reduced by the pretreatment of finely divided collagen with the enzyme solution. Unswollen particles are removed from the collagen dispersion by decantation, filtration, or by centrifugation, and shaped collagen articles, are prepared by precipitation of collagen from the collagen dispersion. The shaped articles of collagen so prepared, and in particular collagen strands, have markedly increased tensile strengths.

For the purpose of illustration, the following examples are set forth to illustrate the process of this invention but are not to be construed as limiting the spirit of the invention or its scope.

EXAMPLE I

Fresh bovine tendons from which the fat and fascia had been mechanically removed were sliced across the grain to provide slices 10 to 30 mils thick. Twenty grams of the tendon slices were added to 200 cc. of an enzyme solution containing one percent by weight of malt diastase, U.S.P. IX, buffered at a pH of 8. The enzyme solution containing the tendon slices was incubated for sixteen hours at a temperature of 37° C. The tendon slices were then removed from the enzyme solution by filtration, washed five times with distilled water, and added to 400 cc. of an 0.3 percent aqueous solution of acetic acid and allowed to remain in the acetic acid solution for 20 hours at room temperature. To determine the amount of acetic acid solution imbibed by the tendon slices, the acetic acid dispersion was centrifuged and the supernatant liquid was removed by decantation. Seventy cc. of supernatant liquid were obtained. Thus, the collagen imbibed 330 cc. (400 cc.–70 cc.). The supernatant liquid was added to the swollen slices from which it had been decanted and the volume of the mixture was increased to two liters by the addition of distilled water. The mixture was mechanically dispersed in a Waring Blendor and then filtered through the open holes of a Büchner funnel to remove large unswollen collagen particles. The filtrate was diluted to a volume of four liters with distilled water and centrifuged. The clear effluent obtained by decantation following centrifugation was neutralized with ammonia and this resulted in precipitation of the collagen in fibrous form. The precipitated collagen was removed from the solution and dried. The weight of the dried collagen was five grams (25% yield based upon the weight of tendon slices).

The above procedure was repeated using the same amount of bovine tendon collagen except that the enzyme treatment was omitted. In this instance, the volume of the supernatant was 265 cc. Only 135 cc. of acetic acid solution was imbibed by the collagen. The yield of dried precipitated collagen was 2 grams (10% based on the tendon slices).

EXAMPLE II

Ten grams of bovine tendon slices, prepared as in Example I, were added to 100 cc. of an 0.5% filtrate of an enzyme obtained from an organism of the *B. subtilis* type (HT concentrate, obtained from Takamine Laboratories, Inc., Clifton, New Jersey). The mixture was buffered at a pH of 8.5 and incubated at 37° C. for sixteen hours. The tendon slices were removed from the mixture, washed five times with distilled water, and sufficient 0.3% aqueous acetic acid solution was added to bring the volume of the mixture to 200 cc. The dispersion in aqueous acetic acid was allowed to stand at room temperature for twenty hours and then centrifuged. Thirty-six cc. of supernatant liquid were obtained upon decantation of the centrifuged dispersion (164 cc. imbibed).

In order to show the effect of the enzyme treatment on the volume of acid solution imbibed, the above procedure was repeated with the omission of the treatment with the enzyme solution, and in this instance, 134 cc. of supernatant liquid were obtained following centrifugation.

EXAMPLE III

Fresh beef hide, from which hair and muscle tissue had been removed, was cut into narrow strips and passed through a meat grinder. Thirty grams of ground hide were added to 100 cc. of a filtered 2% dispersion of malt diastase, U.S.P. IX, and the resulting mixture was incubated for sixteen hours at 37° C. The enzyme solution was decanted and the finely divided beef hide was washed eight times with distilled water and added to 600 cc. of a five percent aqueous solution of acetic acid. The mixture was allowed to stand at room temperature for 48 hours and then filtered through cheesecloth. Ninety-four cc. of filtrate were obtained. The above procedure was repeated but in this instance, the finely divided beef hide was not subjected to the action of the enzyme solution and 115 cc. of filtrate were obtained.

The filtrates in both instances were recombined with the finely divided beef hide, diluted with three liters of distilled water and dispersed in a Waring Blendor. The dispersions were filtered through the open holes of a Büchner funnel to remove large unswollen pieces. The filtrates were each diluted with two liters of distilled water and centrifuged. The clear effluents were free from unswollen particles and were neutralized with ammonia. The precipitated collagen fibers in each instance were removed, washed with acetone, and dried. Four grams of dried collagen fibers were obtained from the process in which the finely divided beef hide was subjected to the enzyme treatment whereas only 1.3 grams of dried collagen fibers were obtained from the process in which the enzyme treatment was omitted.

EXAMPLE IV

Collagen from tendons, purified according to the method of Example I, was used in the preparation of a collagen dispersion. Five grams of dry precipitated collagen in fibrous form were swollen in sufficient 0.3 percent by weight aqueous malonic acid solution to provide a dispersion having a collagen content of 1.6 to 1.8 percent by weight. The dispersion was homogenized in a Waring Blendor and then centrifuged at 30° C. to remove air bubbles. The collagen dispersion was extruded under a constant pressure of twenty pounds of nitrogen as a multifilament into a dehydrating bath of circulating acetone containing sufficient ammonia to neutralize the malonic acid in the dispersion. The spinnerette through which the collagen dispersion was extruded consisted of 40 elongated tubes having an internal diameter of 15 mils, the 40 tubes being arranged in two concentric rows. The speed at which the collagen dispersion was extruded varied from 0.03 to 0.06 cc. of dispersion per second and the spinnerette was rotated at a speed of 0.04 to 1.0 revolution per second. The extruded strand was removed from the dehydrating bath on a godet which imposed a stretch of about 500 percent to the strand. The stretched strand was air-dried and subsequently stretched an additional 30 percent. The above procedure was repeated an additional two times and the three strands obtained had diameters of 10.5, 9.5 and 7.5 mils, tensile strengths of 5.88, 6.0 and 5.0 pounds, and strengths measured in grams per denier of 2.66, 2.47, and 3.80, respectively.

A collagen strand produced according to the above method except that the step in the preparation of the collagen dispersion of treatment with an enzyme was not included, had a diameter of 10.5 mils, a tensile strength of 4.0 pounds, and a strength measured in grams per denier of 2.22 grams.

EXAMPLE V

One hundred grams of bovine tendon slices, prepared as in Example I are added to one liter of an 0.02 percent aqueous ficin solution buffered to pH 6 with the sodium salts of ethylene diamine tetraacetic acid (0.01 mole). A mixture of the disodium salt (about 35%) with the tetrasodium salt (about 65%) results in a pH of 6. The tendon slices are allowed to stand overnight in this solution at room temperature. About 3.4 cc. of 30 percent hydrogen peroxide is then added to the ficin solution with stirring and the mixture is allowed to stand for one hour to thoroughly inactivate the ficin adsorbed on the collagen fibers. The tendon slices following this treatment are free of elastin and may be rapidly dispersed without degradation in 10 liters of an 0.3 percent solution of acetic acid.

EXAMPLE VI

Pinguinain is an enzyme obtained from the Maya fruit (indigenous to Cuba) that has elastase activity. One hundred mg. of this enzyme is dissolved in 50 ml. of water containing 500 mg. of sodium thiosulfate and 0.1 molar phosphate buffer is added to bring the total volume to 100 ml. The pH of the enzyme solution so obtained is 5.6. Ten grams of sliced bovine tendon (15 mil thickness) are added and the mixture is allowed to stand overnight at room temperature. Hydrogen peroxide is then added with stirring until the total concentration of hydrogen peroxide in solution is 0.1 percent. The mixture is allowed to stand for one hour to assure destruction of the proteolytic enzyme, and the treated slices are then placed in a Waring Blendor and dispersed in 500 ml. of an 0.45 percent solution of lactic acid.

EXAMPLE VII

Twenty ml. of a one percent solution of malt diastase U.S.P. IX at pH 8.5 is incubated overnight with 25 mg. of an elastin substrate prepared from bovine ligamentum nuchae at temperatures of 4° C., 20° C., 37° C.; after incubation the dry weight of the nondigested substrate is measured. An apparent increase in activity is noted as temperature is increased.

*Temperature effect on activity*

| Temperature | Malt Concentration, percent | Activity as Percent of Substrate Digested |
|---|---|---|
| 4° C | 1 | 15 |
| 20° C | 1 | 20 |
| 37° C | 1 | 34 |

In another experiment a 0.1 ml. phosphate buffer solution of pH 8.5 is prepared containing 10 mg. of elastin derived from malt diastase U.S.P. IX in 10 ml. of solution. One 10 ml. portion of this solution is heated at 50° C. for 10 minutes. Another 10 ml. portion is heated at 60° C. for 10 minutes. A third 10 ml. portion is not heated. 50 mg. of the elastin substrate described above is added to each of the three enzyme solutions and allowed to stand overnight at room temperature. The following morning the dry weight of the nondigested substrate is measured.

*Heat inactivation of active malt fraction*

| Enzyme Treatment | Activity as Percent of Substrate Digested |
| --- | --- |
| Non-heated enzyme | 38 |
| 50° C. heated enzyme | 18 |
| 60° C. heated enzyme | 0 |

The above examples show that elastin fibers are the primary limiting factor in making dispersions or gels of collagen from connective tissue. By removal of the elastin and thus loosening the whole structure, secondary effects take place, particularly in respect to carbohydrates. Carbohydrates as occurring in connective tissues can partly be extracted with, for instance, neutral salts and other salts, according to many literature references. The extraction, however, is never a complete extraction. This extraction of the carbohydrates becomes more complete after treatment of the connective tissue with elastase and without the use of carbohydrates, as we have found by analytical determinations of the carbohydrates. This may also be due to the loosening of the whole structure, making the carbohydrates embedded between protein fibers more accessible to the extracting salt solution. The same phenomena also makes it easier to separate the non-dispersible reticulin from the collagen, as well as fat and other non-collagenous components.

It is a primary advantage of our invention that by the process described one may rapidly convert the major part of connective tissue collagen into collagen dispersions which are suitable to be utilized technologically.

What is claimed is:

1. In a process for preparing a dispersion of swollen collagen fibers in a aqueous acid solvent, the improvement comprising: treating finely divided connective tissue which is substantially free from fat and muscle tissue with a solution of an elastase at a temperature within the range of from about 5° C. to about 45° C., the pH of the treating solution being within the range of from about 5 to about 9, whereby all elastin is removed without altering the collagen present in said connective tissue and removing the elastase adsorbed on the residual collagen fibers to avoid destruction of said collagen fibers.

2. In a process for preparing a dispersion of swollen collagen fibers in a aqueous acid solvent, the improvement comprising: treating thin slices of connective tissue which is substantially free from fat and muscle tissue with a solution of an elastase at a temperature within the range of from about 5° C. to about 45° C., the pH of the treating solution being within the range of from 8.0 to 9.0, whereby all elastin is removed without altering the collagen present in said connective tissue and removing the elastase adsorbed on the residual collagen fibers to avoid destruction of said collagen fibers.

3. In a process for preparing a dispersion of swollen collagen fibers in an acidic solvent, the improvement comprising: treating finely divided connective tissue which is substantially free from fat and muscle tissue with a solution of an elastase at a temperature within the range of from about 5° C. to about 45° C., the pH of the treating solution being within the range of from about 5 to about 9, whereby all elastin is removed without altering the collagen present in said connective tissue, removing the elastase adsorbed on the residual collagen fibers to avoid destruction of said collagen fibers, and dispersing the substantially pure collagen fibers so obtained in an acidic solvent.

4. In a process for preparing a dispersion of swollen collagen fibers in an acidic solvent, the improvement comprising: treating finely divided native collagen which is substantially free from fat and muscle tissue with a solution of ficin at a temperature within the range of from about 5° C. to about 45° C., the pH of the treating solution being within the range of from 5.0 to 7.0, whereby all elastin is removed without altering the collagen, removing the ficin adsorbed on the residual collagen fibers to avoid destruction of said collagen fibers.

5. In a process for preparing a dispersion of swollen collagen fibers in an acidic solvent, the improvement comprising: treating tendon slices that are substantially free from fat and muscle tissue with a solution of ficin at a temperature within the range of from about 5° C. to about 45° C., the pH of the treating solution being within the range of from about 5 to about 7, whereby all elastin is removed without altering the collagen present in said tendon slices and destroying the ficin adsorbed on the residual collagen fibers with hydrogen peroxide to avoid destruction of said collagen fibers.

6. In a process for preparing a dispersion of swollen collagen fibers in an acetic solvent, the improvement comprising: treating tendon slices that are substantially free from fat and muscle tissue with a solution containing about 0.01 percent to 0.1 percent ficin at a temperature within range of from about 5° C. to about 45° C., the pH of the treating solution being within the range of from about 5 to 7, whereby all elastin is removed without altering the collagen present in said tendon slices, destroying the ficin adsorbed on the residual collagen fibers with hydrogen peroxide to avoid destruction of said collagen fibers and dispersing the substantially pure collagen fibers so obtained in an acidic solvent.

7. A process according to claim 1 in which the elastase is malt diastase U.S.P. IX.

8. In a process for preparing a dispersion of substantially pure collagen in an aqueous acid solvent, the improvement comprising: treating finely divided native collagen which is substantially free from fat and muscle tissue with a solution of an elastase capable of acting on and dissolving non-collagenous substances including elastin for a period of at least about ten hours at a temperature within the range of from about 5° C., to about 45° C., the pH of the treating solution being within the range of from about 5 to about 9 whereby all elastin is removed without altering the collagen and deactivating the elastase adsorbed on the residual collagen fibers to avoid destruction of said collagen fibers.

9. In a process for preparing a dispersion of substantially pure collagen in an aqueous acid solvent, the improvement comprising: treating finely divided native collagen which is substantially free from fat and muscle tissue with a solution of pinguinain capable of acting on and dissolving non-collagenous substances including elastin for a period of at least about ten hours at a temperature within the range of from about 5° C., to about 45° C., the pH of the treating solution being within the range of from 8.0 to 9.0 whereby all elastin is removed without altering the collagen and treating the residual collagen fibers with hydrogen peroxide to avoid destruction of said collagen fibers.

10. A process according to claim 8 in which the enzyme is malt diastase, U.S.P. IX.

References Cited in the file of this patent

UNITED STATES PATENTS 2,369,256  Schmitt _____ Feb. 13, 1945

OTHER REFERENCES

Nature, vol. 164, page 491 (1949).
Nature, vol. 170, pages 264–266 (1952).